3,836,587
ORGANO PHOSPHONIUM SALTS

Martin Grayson, Norwalk, and Patricia Tarpey Keough, Ridgefield, Conn., assignors to American Cyanamid Company, Stamford, Conn.
No Drawing. Application Nov. 17, 1969, Ser. No. 871,628, now Patent No. 3,689,601, which is a continuation of abandoned application Ser. No. 674,107, Oct. 10, 1967, which in turn is a continuation of abandoned application Ser. No. 292,123, July 1, 1963. Divided and this application May 22, 1972, Ser. No. 255,770
Int. Cl. C07f 9/28
U.S. Cl. 260—606.5 F    1 Claim

ABSTRACT OF THE DISCLOSURE

Organo phosphonium salts of the formula:

(A)     $[R^1R^2R^3PCH_2CH_2Q]^\oplus X^\ominus$ are prepared by reacting compounds of the formulae:

(I)     $R^1R^2R^3PCH_2CH_2OY \cdot X$ or (II)     $R^1R^2R^3PCH=CH_2 \cdot X$ with H—Q wherein: X is halogen, Y is the residue of an acylating agent, and Q is the residue of a reactant having an electronegative group and providing a replaceable hydrogen atom (H) which is replaced by the $R^1R^2R^3PCH_2CH—$ group of compounds I or II in forming the compound A.

---

This is a division of copending application Ser. No. 871,628, filed Nov. 17, 1969 now Pat. No. 3,689,601, which was a continuation of application Ser. No. 674,107, filed Oct. 10, 1967, now abandoned, which was a continuation of application Ser. No. 292,123, filed July 1, 1963, now abandoned.

The present invention relates to organophosphorus compounds and to a method of preparing same. More particularly, the instant discovery concerns phosphonium salt derivatives of tertiary phosphines.

It has been found that tertiary phosphines generally will react with halo-substituted ethanol to produce the corresponding trialkyl-, tricycloalkyl-, or tri-aryl- 2-hydroxyethylphosphonium salts. In turn, these salts may be acylated using a lower alkanoic anhydride, lower alkanoic acid, or the like, to produce their corresponding trialkyl-, tricycloalkyl, or triaryl- 2-acetoxyethylphosphonium salts.

The following equations illustrate this general reaction:

(A) $R^1R^2R^3P + XCH_2-CH_2-OH \longrightarrow$

(B) 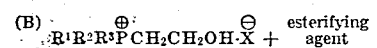 + esterifying agent $\longrightarrow$

$R^1,R^2,R^3$ each representing, as will be seen hereinafter, alkyl, cycloalkyl and aryl, X representing halogen or tetraphenyl borate, and Y representing the residue of an acylating or esterifying agent. The following is a typical embodiment of generic equations (A) and (B), above:

$(n-C_4H_9)_3P + BrCH_2CH_2OH \longrightarrow (n-C_4H_9)_3\overset{\oplus}{P}CH_2CH_2OH \cdot Br^\ominus$ $(n-C_4H_9)_3\overset{\oplus}{P}CH_2CH_2OH \cdot Br^\ominus + CH_3COCl \longrightarrow$

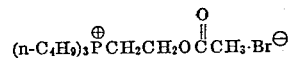

The trialkyl-, tricycloalkyl-, and triaryl- 2-acetoxyethylphosphonium salts prepared as above may, in turn, be converted to their corresponding vinylphosphonium salts according to the following general equation:

(C) $R^1R^2R^3\overset{\oplus}{P}CH_2CH_2OY \cdot X^\ominus \xrightarrow{base} R^1R^2R^3\overset{\oplus}{P}CH=CH_2 \cdot X^\ominus$ in which $R^1$, $R^2$, $R^3$, Y and X are the same as above.

The following is a typical embodiment of equation (C), above:

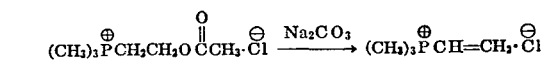

More specifically, in generic equations (A), (B) and (C), above $R^1$, $R^2$ and $R^3$ each represent alkyl $C_1$–$C_{16}$, substituted alkyl $C_1$–$C_{16}$, cycloalkyl, and aryl; X represents halogen, such as bromo, chloro and iodo, and tetraphenyl borate; and Y in equations (B) and (C) represents the residue of an acylating agent as shown in the specific embodiments, supra.

Typical tertiary phosphine reactants are the following: trimethylphosphine, triethylphosphine, tripropylphosphine, tributylphosphine, tripentylphosphine, trihexylphosphine, triheptylphosphine, trioctylphosphine, trinonylphosphine, tridecylphosphine, triundecylphosphine, tridodecylphosphine, tritridecylphosphine, tritetradecylphosphine, tripentadecylphosphine, trihexadecylphosphine, dodecyldiethylphosphine, dioctylpropylphosphine, diethylbutylphosphine, butylethylhexylphosphine, tri(2-methoxypentyl)phosphine, tris-2-cyanoethylphosphine, diethyl-2-ethoxyheptylphosphine, tricyclopropylphosphine, tricyclohexylphosphine, triphenylphosphine, diphenylnaphthylphosphine, trixylylphosphine, tritolylphosphine, tris(para-ethoxyphenyl)phosphine, tris(para - chlorophenyl)phosphine, tris(2-chlorophenyl)phosphine, tris(3-bromophenyl)phosphine, and the like.

Typical esterifying agents follow: lower alkanoic anhydrides, such as acetic anhydride, propionic anhydride, butanoic anhydride; lower alkanoic acids, such as formic acid, acetic acid, propionic acid, butanoic acid; acylating ($C_2$–$C_{18}$ alkanoyl) halides, such as acetyl chloride, propionyl bromide, butyryl iodide, octanoyl chloride, dodecanoyl bromide, stearyl chloride, hexanoyl bromide; isopropenyl acetate; aryl sulfonyl halides, such as paratoluenesulfonyl chloride, phenyl sulfonyl bromide, 2,4-dimethylphenylsulfonyl chloride; alkyl (lower) chloroformates, such as ethylchloroformate, butylchloroformate; alkyl (lower) carbonates, such as diethylcarbonate, dipropylcarbonate, dibutylcarbonate; ketene; dimethyl sulfate; nitrosyl chloride; and trimethyl phosphate.

In equation (C), above, typical suitable inorganic and organic bases are: alkali metal hydroxides, such as sodium hydroxide, potassium hydroxide, lithium hydroxide; alkali metal carbonates, such as sodium carbonate, potassium carbonate, lithium carbonate; alkaline earth metal hydroxides, such as magnesium hydroxide, barium hydroxide, calcium hydroxide; alkaline earth metal carbonates, such as magnesium carbonate, barium carbonate, calcium carbonate; activated alumina; and quaternary ammonium hydroxides, such as tetraalkyl (lower)ammonium hydroxides, including tetramethylammonium hydroxide, tetrapropylammonium hydroxide, and tetrabenzylammonium hydroxide; and basic ion exchange resins.[1]

The reaction in equation (A) hereinabove is carried out at a temperature in the range of 30° C. to 250° C., preferably 60° C. to 180° C. The equation (B) reaction, above, is best carried out at a temperature in the range of 5° C. to 150° C. As to equation (C), above, this reaction is generally carried out at a temperature in the range of 20° C. to 180° C., preferably 50° C. to 150° C.

Each of these three reactions may be carried out at atmospheric, sub-atmospheric or super-atmospheric pressure; preferably, however, reaction is carried out at atmospheric pressure. By the same token, the ratio of the reactants in each of equations (A), (B) and (C) is not critical, an excess of either reactant, in each equation, with respect to the other being suitable. In equation (B), however, an excess of about 10% by weight of the acylating agent relative to the phosphonium salt reactant is preferred. Generally in equations (A) and (C) stoichiometric amounts of the reactants are employed.

The reactions of equation (A), above, are best carried out in the presence of an inert organic solvent, i.e., a solvent which does not enter into or otherwise interfere with the reaction under the conditions contemplated herein. Typical solvents are dimethoxyethane, dioxane, ethylacetate, tetrahydrofuran, and the like.

The reactions of equation (B) similarly are best carried out in the presence of an inert organic solvent of the type described for equation (A), as well as acetic acid, dimethylformamide, diglyme, and the like.

As to equation (C), typical suitable inert organic solvents in which the phosphonium salt is solvent, which solvents do not interfere or enter into reaction to any substantial degree, are dimethoxyethane, dioxane, dimethylformamide, diglyme, acetonitrile, ethylacetate, tetrahydrofuran, and other like linear and cyclic ethers, acetate esters (lower alkyl).

Alternatively, it has been found pursuant to the instant discovery that the products of equation (A), above, may be converted directly to the products of equation (C), thusly, (D)

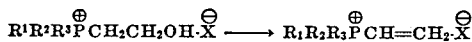

in the presence of any base given above for equation (C) and at a temperature in the range of 100° C. to 250° C. As in equation (C), a solvent of the type given hereinabove for equation (C) is suitable and herein contemplated. If desired, the reaction may be carried out in the presence of a dehydrating agent, such as a siliceous agent including silica (e.g. silica gel), silica-alumina, and the like, in which the other inert organic solvents are also suitable, e.g. aromatic hydrocarbons, such as toluene, benzene, xylene, cymene, and the like, methylene chloride, ethylene chloride, etc.

The products of equations (A), (B), (C) and (D) above are useful as fire retardants in plastics, e.g., from 0.5 to 30 parts by weight of any one of above compounds when incorporated into 100 parts by weight of a thermoplastic polymer material, such as polyethylene, polypropylene, polystyrene, polyacrylate, polymethylmethacrylate, or the like, provides enhanced fire retardance to the polymer material upon exposure to an open flame.

While the following examples specify certain details as to certain embodiments of the present invention, it is not intended that these details impose unnecessary limitations upon the scope of the instant discovery, excepting of course that these limitations appear in the appended claims:

---
[1] Typical are: polymeric quarternary ammonium salts, e.g., polymeric trimethylbenzyl ammonium chloride, etc.

EXAMPLE I

Tributyl-2-hydroxyethylphosphonium tetraphenylborate

Tributyl - 2 - hydroxyethylphosphonium bromide, obtained from combining tributylphosphine and 2-bromoethanol in 1,2-dimethoxyethane and refluxing under nitrogen, is dissolved in water and treated with excess 0.1N sodium tetraphenylboron. The resulting precipitate is filtered and recrystallized from ethanol to yield product tributyl - 2 - hydroxyethylphosphonium tetraphenylborate with melting point 124° C.–125° C. Analysis of product (Found: C, 80.03; H, 9.00; P, 5.35. $C_{38}H_{52}O$ requires: C, 80.55; H, 9.25; P, 5.47%.)

As is evident from this Example, the halide salts of Equation (A) may be converted, in situ or after recovery thereof, to the corresponding tetraphenylborate salts.

EXAMPLE II

Tributyl-2-acetoxyethylphosphonium bromide 1,2-Dimethoxyethane (275 milliliters), freshly distilled from calcium hydride, 2-bromoethanol (133 grams, 1.06 moles), and tributylphosphine (204 grams, 1.01 moles) are combined under nitrogen and refluxed at 85° C. overnight with stirring. A heavy oil forms within an hour. Isopropenyl acetate (320 grams, 3.2 moles) and 48% HBr (3 drops) are slowly added to the reaction mixture which is then refluxed 18 hours. Volatile components are removed *in vacuo* at 70° C. Product (372.5 grams; 99.9% yield) remains as a thick hygroscopic oil, which could be forced to crystallized by stirring in a benzene-petroleum ether (boiling point 30° C.–60° C.) mixture. Crystalline tributyl-2-acetoxyethylphosphonium salt is obtained from part of the oily product by freeze drying a benzene solution of the oil.

EXAMPLE III

Tributyl-2-acetoxyethylphosphonium tetraphenylborate

Tributyl - 2 - acetoxyethylphosphonium bromide oil (16.2 grams produced as in Example II, above) is dissolved in water and treated with sodium tetraphenylboron (15 grams) dissolved in water. A white precipitate appears which is filtered and recrystallized from ethanol containing enough acetonitrile to cause solution at the boiling point of the mixture. Tributyl-2-acetoxyethylphosphonium tetraphenylborate (16.7 grams) is obtained with melting point of 177° C.–179° C. Analysis of product (Found: C, 76.65; H, 8.83; P, 5.24. $C_{40}H_{54}O_2BP$ requires: C, 78.93; H, 8.94; P, 5.10%.)

EXAMPLE IV

Triphenyl-2-acetoxyethylphosphonium iodide

2-Iodoethyl acetate is prepared from the nucleophilic exchange reaction of sodium iodide and 2-chloroethylacetate in refluxing acetone under nitrogen (boiling point 86° C.–90° C. at 33 milliliters mercury). Triphenylphosphine (7.35 grams) is reacted with 2-iodoethylacetate (24 grams) under nitrogen with stirring at 80° C. for 4.5 hours. The excess 2-iodoethylacetate is distilled off *in vacuo*. Crude, brown crystalline product (14.20 grams) is obtained by washing oily residue with ether. It is washed with ether, ethylacetate, and acetone and recrystallized from acetonitrile to give product (7.90 grams) with melting point 161° C.–163° C. Analysis of product (Found: C, 55.16; H, 4.80; I, 26.77; P, 6.45. $C_{22}H_{22}O_2IP$ requires: C, 55.47; H, 4.66; I, 26.66; P, 6.51%.)

Example IV represents still another embodiment of the present invention wherein the product salts of Equation B, above, are prepared directly from the reaction of a 2-haloethyl acetate with a tertiary phosphine of the type contemplated herein.

The process of Example IV, above, may be carried out using any of the tertiary phosphine reactants contemplated herein and the corresponding tri-substituted - 2-acetoxyethylphosphonium halide produced and recovered, according to the following equation (E)
$$R^1R^2R^3P + XCH_2CH_2O\overset{O}{\overset{\|}{C}}-CH_3 \longrightarrow R^1R^2R^3\overset{\oplus}{P}CH_2CH_2OY\cdot\overset{\ominus}{X}$$

wherein $R^1, R^2, R^3$, X and Y have the meanings given hereinabove in equations (A) and (B).

Equation (E) is best carried out at a temperature in the range of 5° C. to 150° C., preferably at the reflux temperature of the solvent employed. Typical inert organic solvents contemplated for equation (E) are acetone, lower alkanol (ethanol, butanol), plus the solvents listed hereinabove for equation (C). The reaction under equation (E), as shown in Example IV, supra, is best carried out under inert conditions, such as under nitrogen. Other 2-haloethyl acetate reactants contemplated herein are 2-bromoethyl acetate and 2-chloroethyl acetate.

Tables A, B, C, D and E, which follow, correspond to equations (A), (B), (C), (D) and (E), respectively. The examples in Tables A and B are carried out essentially as in Examples I and II, respectively supra, excepting of course as shown in Tables A and B. The examples in Table C are carried out essentially as in Example LX, infra, excepting of course as shown in Table C. Likewise, the products of Table D are recovered essentially as in Example LX, infra. The examples in Table E are carried out essentially as in Example IV, supra, excepting of course as shown in Table E.

TABLE A $$R^1R^2R^3P + XCH_2CH_2OH \longrightarrow R^1R^2R^3\overset{\oplus}{P}CH_2CH_2OH\ \overset{\ominus}{X}$$

| Ex. No. | R¹ | R² | R³ | Moles R¹R²R³P | X | Moles XCH₂CH₂OH | Solvent | Milliliters of solvent | Temp., °C. | Product |
|---|---|---|---|---|---|---|---|---|---|---|
| V | CH₃ | CH₃ | CH₃ | 1 | Br | 1.0 | DME¹ | 1,500 | 70 | 2-hydroxyethyltrimethylphosphonium bromide. |
| VI | n-C₄H₉ | n-C₄H₉ | n-C₄H₉ | 1 | Cl | 1.0 | DME | 1,500 | 83 | 2-hydroxyethyltributylphosphonium chloride. |
| VII | n-C₄H₉ | n-C₄H₉ | n-C₄H₉ | 1 | Cl | 1.2 | Dioxane | 1,200 | 101 | Do. |
| VIII | n-C₄H₉ | n-C₄H₉ | n-C₄H₉ | 1 | I | 1.2 | do | 2,000 | 101 | 2-hydroxyethyltributylphosphonium iodine. |
| IX | i-C₄H₉ | i-C₄H₉ | i-C₄H₉ | 1 | Cl | 0.9 | Ethyl acetate. | 1,800 | 50 | 2-hydroxyethyltriisobutylphosphonium chloride. |
| X | n-C₈H₁₇ | n-C₈H₁₇ | n-C₈H₁₇ | 1 | Cl | 1.1 | DME | 1,700 | 83 | 2-hydroxyethyltrioctylphosphonium chloride. |
| XI | n-C₁₂H₂₅ | n-C₁₂H₂₅ | n-C₁₂H₂₅ | 1 | Cl | 1.1 | DME | 1,700 | 83 | 2-hydroxyethyltridodecylphosphonium chloride. |
| XII | C₁₆H₃₃ | C₁₆H₃₃ | C₁₆H₃₃ | 1 | Cl | 1.3 | THF² | 1,600 | 30 | 2-hydroxyethyltrihexadecylphosphonium chloride. |
| XIII | C₂H₅ | C₂H₅ | C₂H₅ | 1 | Cl | 1.0 | Dioxane | 1,700 | 200 | 2-hydroxyethyltriethylphosphonium chloride. |
| XIV | C₄H₉ | C₂H₅ | C₆H₁₃ | 1 | Cl | 1.1 | Ethyl acetate. | 2,000 | 45 | 2-hydroxyethylbutylethylhexylphosphonium chloride. |
| XV | C₂H₅ | C₂H₅ | CH₂ \| C₂H₅O—CH₂ | 1 | Cl | 1.2 | Dioxane | 1,800 | 75 | 2-hydroxyethyldiethyl-2-ethoxyethylphosphonium chloride. |
| XVI | cyclohexyl | cyclohexyl | cyclohexyl | 1 | Br | 1.3 | DME | 1,600 | 60 | 2-hydroxyethyltricyclohexylphosphonium bromide. |
| XVII | cyclopentyl | cyclopentyl | cyclopentyl | 1 | Cl | 0.9 | DME | 2,000 | 80 | 2-hydroxyethyltricyclopentylphosphonium chloride. |
| XVIII | phenyl | phenyl | naphthyl | 1 | I | 1.1 | Dioxane | 1,500 | 90 | 2-hydroxyethyldiphenylnaphthylphosphonium iodide. |
| XIX | phenyl | phenyl | phenyl | 1 | I | 1.0 | Dioxane | 2,000 | 101 | 2-hydroxyethyltriphenylphosphonium iodide. |
| XX | p-Cl-phenyl | p-Cl-phenyl | p-Cl-phenyl | 1 | Cl | 1.2 | Ethyl acetate. | 1,600 | 65 | 2-hydroxyethyl-tri(para-chlorophenyl)phosphonium chloride. |
| XXI | p-CH₃-phenyl | p-CH₃-phenyl | p-CH₃-phenyl | 1 | Cl | 1.3 | DME | 1,700 | 83 | 2-hydroxyethyl-tri(para-tolyl)-phosphonium chloride. |

¹ DME = Dimethoxyethane. ² THF = tetrahydrofuran.

TABLE B

| Example No. | Product of example No. | Moles $R_3\overset{\oplus}{P}CH_2CH_2OH\cdot\overset{\ominus}{X}$ | A | Moles A | Solvent (ml.) | Temp., °C. | Product |
|---|---|---|---|---|---|---|---|
| XXII | V | 2.0 | Isopropenyl acetate. | 3.2 | DME, 300 | 83 | 2-acetoxyethyltrimethyl phosphonium bromide. |
| XXIII | VI | 1.0 | Dimethyl sulfate. | 3.8 | Dioxane, 300 | 90 | 2-methylsulfatoethyltributylphosphonium chloride. |
| XXIV | VII | 0.8 | Acetic anhydride. | 1.0 | Acetic acid, 300 | 120 | 2-acetoxyethyltributyl phosphonium chloride. |
| XXV | VIII | 0.9 | Nitrosyl chloride. | 1.1 | Diglyme | 120 | 2-nitroethyltributyl phosphonium iodide. |
| XXVI | IX | 1.0 | Acetyl chloride. | 1.2 | DME, 500 | 30 | 2-acetoxyethyltriisobutylphosphonium chloride. |
| XXVII | XI | 1.0 | p-Toluenesulfonyl chloride. | 1.0 | DME, 200 | 60 | 2-(p-toluenesulfonyloxy)ethyltridodecylphosphonium chloride. |
| XXVIII | XIII | 1.0 | Trimethyl phosphate. | 1.1 | Acetic acid 500 | 80 | 2-dimethylphosphatoethyltriethyl phosphonium chloride. |
| XXIX | XII | 1.0 | Propionic acid. | 2.4 | DMF,[1] 300 | 10 | 2-propionyloxyethyltrihexadecylphosphonium chloride. |
| XXX | XIV | 1.0 | Butanoic anhydride. | 1.0 | DMF, 1,000 | 30 | 2-butyryloxyethylbutylethylhexylphosphonium chloride. |
| XXXI | XV | 0.8 | Acetic acid | 4.0 | None | 118 | 2-acetoxyethyldiethyl-2-ethoxyethylphosphonium chloride. |
| XXXII | XVI | 0.9 | Acetyl chloride. | 1.0 | DME, 200 | 65 | 2-acetoxyethyltricyclohexylphosphonium chloride. |
| XXXIII | XVII | 1.0 | Hexanoyl chloride. | 1.9 | Dioxane, 150 | 25 | 2-hexanoyloxyethyltricyclopentylphosphonium chloride. |
| XXXIV | XIX | 1.0 | Acetic anhydride. | 6.0 | None | 100 | 2-acetoxyethyltriphenyl phosphonium iodide. |
| XXXV | XVIII | 1.1 | Stearyl chloride. | 3.3 | DME, 700 | 50 | 2-stearyloxyethyldiphenylnaphthylphosphonium iodide. |
| XXXVI | XX | 1.0 | Dodecanoyl bromide. | 4.0 | DMF, 1,000 | 40 | 2-dodecanoyloxyethyltri(parachlorophenyl)-phosphonium chloride. |
| XXXVII | XXI | 1.0 | Phenylsulfonyl bromide. | 1.0 | Dioxane, 600 | 65 | 2-(phenylsulfonyloxy)ethyltri(para-tolyl)phosphonium chloride. |
| XXXVIII | V | 1.0 | Ethylchloroformate. | 2.0 | Diglyme, 300 | 40 | 2-(ethoxycarbonyloxy)ethyltrimethyl phosphonium bromide. |
| XXXIX | VII | 0.9 | Dipropyl carbonate. | 3.0 | DME, 250 | 100 | 2-(propoxycarbonyloxy)ethyltributylphosphonium chloride. |
| XL | VII | 1.0 | Ketene | 1.0 | THF, 500 | 75 | 2-acetoxyethyltributyl phosphonium chloride. |

[1] DMF=Dimethylformamide.

TABLE C

| Example No. | Product of example No. | $R^1R^2R^3\overset{\oplus}{P}CH_2CH_2OY\cdot\overset{\ominus}{X}$ | Base | Moles of base | Solvent[1] (ml.) | Temp., °C. | Product |
|---|---|---|---|---|---|---|---|
| XLI | XXII | 1.0 | $K_2CO_3$ | 1.0 | DME, 300 | 83 | Vinyltrimethylphosphonium bromide. |
| XLII | XXIII | 1.0 | $Na_4CO_3$ | 2.0 | Dioxane, 300 | 100 | Vinyltributylphosphonium chloride. |
| XLIII | XXIV | 1.0 | $Li_2CO_3$ | 4.0 | Ethyl acetate, 500. | 80 | Do. |
| XLIV | XXV | 2.0 | $Mg(CO_3)$ | 8.0 | Diglyme | 100 | Vinyltributylphosphonium iodide. |
| XLV | XXVI | 0.5 | $Ba(OH)_2$ | 1.0 | Acetonitrile, 500. | 80 | Vinyltriisobutylphosphonium chloride. |
| XLVI | XXVII | 0.9 | $Ca(OH)_2$ | 1.1 | THF, 600 | 60 | Vinyltridodecylphosphonium chloride. |
| XLVII | XXVIII | 1.0 | Polymeric trimethylbenzyl ammonium chloride. | 4.0 | DME, 400 | 85 | Vinyltriethylphosphonium chloride. |
| XLVIII | XXIX | 1.0 | KOH | 1.0 | THF | 150 | Vinyltrihexadecylphosphonium chloride. |
| XLIX | XXX | 1.0 | NaOH | 1.0 | Acetonitrile | 20 | Vinylbutylethylhexylphosphonium chloride. |
| L | XXXI | 1.0 | LiOH | 1.0 | do | 60 | Vinyldiethyl-2-ethoxyethylphosphonium chloride. |
| LI | XXXII | 1.0 | $Mg(OH)_2$ | 3.0 | THF | 72 | Vinyltricyclohexylphosphonium bromide. |
| LII | XXXIII | 2.0 | $Ca(CO_3)$ | 1.0 | Dioxane | 180 | Vinyltricyclopentylphosphonium chloride. |
| LIII | XXXIV | 0.5 | $Ba(CO_3)$ | 1.0 | DME | 81 | Vinyltriphenylphosphonium iodide. |
| LIV | XXXV | 3.0 | Polymeric triethylbenzyl ammonium hydroxide. | 1.0 | Dioxane | 97 | Vinylphenylnaphthylphosphonium iodide. |
| LV | XXXVI | 1.0 | do | 5.0 | DME | 50 | Vinyltri(para-chlorophenyl)-phosphonium chloride. |
| LVI | XXXVII | 1.0 | Activated alumina | 1.0 | THF | 35 | Vinyltri(para-tolyl)phosphonium chloride. |
| LVII | XXXVIII | 1.0 | Tetramethylammonium hydroxide. | 1.7 | Diglyme | 42 | Vinyltrimethylphosphonium bromide. |
| LVIII | XXXIX | 2.0 | Tetrapropylammonium hydroxide. | 1.0 | DMF | 37 | Vinyltributylphosphonium chloride. |
| LIX | XL | 1.0 | Tetrabenzylammonium hydroxide. | 1.0 | DME | 25 | Do. |

[1] When not specified the amount of solvent employed is 500 milliliters.

TABLE D $$R^1R^2R^3\overset{\oplus}{P}CH_2CH_2OH\cdot\overset{\ominus}{X} \xrightarrow{\text{base}} R^1R^2R^3\overset{\oplus}{P}CH=CH_2\cdot\overset{\ominus}{X}$$

| Example No. | Product of Example No. | Base | Temp., °C. | Dehydrating agent | 500 milliliters of solvent | Product |
|---|---|---|---|---|---|---|
| 1 | VI | Na₂CO₃ | 120 | Silica gel ¹ | DME | Vinyltributylphosphonium chloride. |
| 2 | XI | Ca(OH)₂ | 100 | Silica-alumina ² | DME | Vinyltridodecylphosphonium chloride. |
| 3 | XII | Li₂CO₃ | 220 | | THF | Vinyltrihexadecylphosphonium chloride. |
| 4 | XV | LiOH | 180 | Silica-alumina ² | Dioxane | Vinyldiethyl-2-ethoxyethylphosphonoium chloride. |
| 5 | XVI | Mg(OH)₂ | 150 | Silica gel ¹ | DME | Vinyltricyclohexylphosphonium bromide. |
| 6 | XVIII | Na₂CO₃ | 250 | | Dioxane | Vinyldiphenylnaphthylphosphonium iodide. |
| 7 | XIX | BaCO₃ | 205 | | do | Vinyltriphenylphosphonium iodide. |
| 8 | XX | Na₂CO₃ | 200 | | DME | Vinyltri(para-chlorophenyl)phosphonium chloride. |
| 9 | XXI | Activated alumina. | 175 | | DME | Vinyltri(para-tolyl)phosphonium chloride. |

¹ Finely-divided particulates.   ² Finely-divided particulates.

TABLE E

| Example No. | R¹R²R³P plus | XCH₂CH₂OC(=O)—CH₃ | Temp., °C. | Solvent | Product |
|---|---|---|---|---|---|
| 10 | Tridodecylphosphine | X=Br | Reflux | Ethanol | Tridodecyl-2-acetoxyethylphosphonium bromide. |
| 11 | Tricyclohexylphosphine | X=I | 85 | Acetonitrile | Tricyclohexyl-2-acetoxyethylphosphonium iodide. |
| 12 | Tris(2-chlorophenyl)phosphine | X=Cl | Reflux | Acetone | Tris(2-chlorophenyl)-2-acetoxyethylphosphonium chloride. |
| 13 | Tris(2-methoxypentyl)phosphine | X=I | 50 | Dioxane | 2-acetoxyethylphosphonium iodide. |

By finely-divided particulates in Table (D) is intended 28 to 200 mesh. Larger or smaller particulates are likewise within the purview of the instant discovery.

EXAMPLE LX

Tributylvinylphosphonium bromide

Tributyl - 2 - acetoxyethylphosphonium bromide (23.7 millimoles) is dissolved in 1,2-dimethoxyethane (25 milliliters) and sodium carbonate (5.0 grams, 47 millimoles) is added. The mixture is stirred at reflux under nitrogen for 8 hours. The solid is filtered off and washed with hot 1,2-dimethoxyethane. The combined filtrates are evaporated to leave a semi-solid residue. Recrystallization from ethyl acetate yields product tributylvinylphosphonium bromide (3.3 grams, 10.7 millimoles, 45% yield with melting point 148° C.–150° C.). Further recrystallization from ethyl acetate-acetonitrile raises the melting point to 151.5° C. to 152.5° C.

Pursuant to the present discovery, the products of Tables B, C, D and E, above, may be reacted with reactants containing an electronegative group and an active hydrogen (i.e., a readily replaceable hydrogen atom) to produce the corresponding organophosphorus derivatives. Typical such reactants are: esters of the formula:

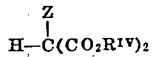

in which Z is hydrogen, alkyl C₁–C₁₈ and cycloalkyl, and R^IV is lower alkyl;

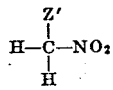

in which Z' is hydrogen or lower alkyl;

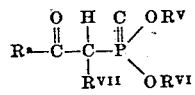

in which R^V and R^VI each represent lower alkyl and R^VII represents hydrogen or lower alkyl; secondary phosphines and phosphine oxides of the formula

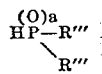

in which (a) is 0 or 1 and R''' is the same as above;

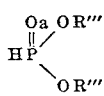

in which (a) is 0 or 1 and R''' is the same as above;

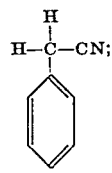

naphthene;

saturated and unsaturated, substituted and unsubstituted cycloaliphatic ketone, such as 2,4-dimethylcyclopentanone, 2,4-dimethylcyclopentene-1-one, isophorone, and the like; indene, nitro- or hydroxy-substituted indene; fluorene, nitro- or hydroxy-substituted fluorene, and other like reactants having an electronegative group and an active hydrogen.

The product salts of this reaction have the following general formula $$[R^1R^2R^3PCH_2CH_2Q]^{\oplus}X^{\ominus}$$

wherein R¹, R², R³ and X have the meanings given hereinbefore and Q is the residue of a reactant of the type described just above, which reactants contain a replaceable hydrogen which has been replaced and the residue is identified as Q, the active hydrogen having been replaced by R¹R²R³PCH₂CH₂—. For example:

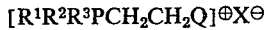

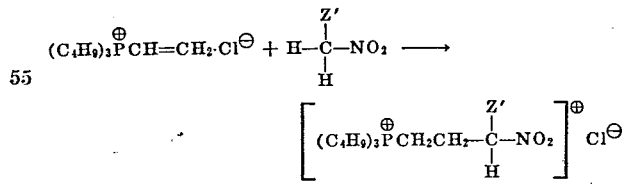

The following examples further illustrate this reaction, Examples LXIV through LXXXVII of Table F being carried out essentially as in Example LX(a), infra, excepting, of course, as shown in Table F, 500 milliliters of solvent being used in each Example:

EXAMPLE LX

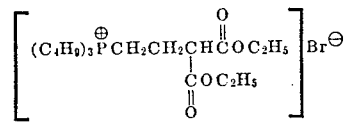

Tributylvinylphosphonium bromide (15.4 grams, 0.05 mole) is allowed to react with 50 milliliters of diethylmalonate and five drops of a 10% aqueous sodium hydroxide solution. The reaction mixture is heated at 130°

C.–135° C. for 3 to 5 hours and then cooled and treated with petroleum ether to precipitate the product

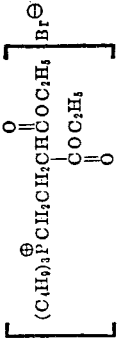

as a heavy yellow oil. This oil is converted to a crystalline derivative, m.p.=137–139° C., by treatment with a 1 N aqueous solution of sodium tetraphenyl boron.

Analysis calculated for $C_{46}H_{61}O_4PB$: C, 78.12; H, 8.33; P, 4.20. Found: C, 78.12; H, 8.79; P, 4.47.

EXAMPLE LXI

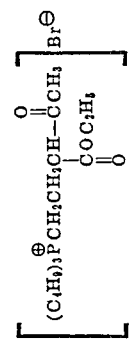

Tributylvinylphosphonium bromide (15.4 grams, 0.05 mole) is allowed to react with 50 milliliters of ethyl acetoacetate and five drops of 10% sodium hydroxide for three hours at 75° C. Treatment of the reaction mixture with petroleum ether yields 90% of the product as a heavy oil which can be converted to the crystalline tetraphenyl borate (m.p. 163–165° C.).

Analysis calculated for $C_{44}H_{60}O_3PB$: C, 78.51; H, 8.99; P, 4.61. Found: C, 77.81; H, 8.93; P, 4.83.

TABLE F

Reactants:
$$R^1R^2R^3\overset{\oplus}{P}CH_2CH_2OY\cdot X^{\ominus} + Q \xrightarrow{base}$$
$$R^1R^2R^3\overset{\oplus}{P}CH=CH_2\cdot X + Q \longrightarrow [R^1R^2R^3\overset{\oplus}{P}CH_2CH_2Q]\oplus X^{\ominus}$$

| Example No. | Product of Example No. | Moles of (1) | Q | Moles of Q | Base | Solvent | Temperature, °C. | Products |
|---|---|---|---|---|---|---|---|---|
| LXII | XLI | 1.0 | $CH_3\overset{O}{\overset{\|}{C}}CH_3$ | 1.0 | $CH_3ONa$ | DMF | 20 | $[(CH_3)_3PCH_2CH_2CH_2\overset{O}{\overset{\|}{C}}CH_3]\oplus Br^{\ominus}$ |
| LXIII | XXVII | 2.0 | (phenyl with two —CH(O)CCH₃ groups) | 1.0 | NaOH | THF | 50 | $[(C_{12}H_{25})_3PCH_2CH_2C\overset{O}{\overset{\|}{\,}}CCH_3]_2\oplus Cl^{\ominus}$ |
| LXIV | XLVIII | 0.8 | $CH_3CH_2CH_2CH_2CH_3$ | 1.0 | NaOH | Dioxane | 10 | $[(CH_3(CH_2)_{10}CH_2)_3PCH_2CH_2\overset{H}{\overset{\|}{C}}-\overset{O}{\overset{\|}{C}}-CH_2CH_2CH_3]\oplus Cl^{\ominus}$ |
| LXV | XXX | 3.0 | $CH_3\overset{O}{\overset{\|}{C}}CH(C_2H_5)\overset{O}{\overset{\|}{P}}-(OC_2H_5)_2$ | 1.0 | $Mg(CO_3)$ | DME | 100 | $[(C_2H_5)_2(CH_3CH_2)(C_6H_5)PCH_2CH_2\overset{C_2H_5O}{\overset{\|}{C}}-\overset{\|}{P}(OC_2H_5)_2]\oplus Cl^{\ominus}$, $O=\overset{\|}{C}-CH_3$ |
| LXVI | L | 1.0 | Cyclohexanone | 3.0 | $K_2(CO_3)$ | Dioxane | 130 | $(C_6H_5)_3(CH_2CH_2)PCH_2CH_2$—(cyclohexanone ring) $\oplus Cl^{\ominus}$ |
| LXVII | XXV | 2.0 | Indene | 1.0 | $(C_2H_5)_3N$ | DMF | 85 | $(C_4H_9)_3PCH_2CH_2$—(indenyl) $\oplus I^{\ominus}$ |

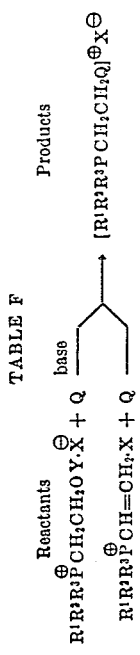

| | | | | | |
|---|---|---|---|---|---|
| LXVIII...... LI | 4.0 | Fluorene | 1.0 | (CH₂)₄—NOH | THF | 25 | [(C₆H₅)₃PCH₂CH₂-fluorenyl]⁺ Br⁻ |
| LXIX...... XXXIII | 2.0 | 2-nitrofluorene | 1.0 | (C₃H₇)₄NOH | Acetonitrile | 32 | [(C₆H₅)₃PCH₂CH₂-(2-nitrofluorenyl)]⁺ Cl⁻ |
| LXX | 3.0 | (methylenedioxybenzene-CH₂-O-C(=O)CH₃) | 1.0 | NaOH | Diglyme | 60 | [(C₆H₅)₃PCH₂CH₂CH(OC(O)CH₃)(methylenedioxyphenyl)]⁺ I⁻ |
| LXXI...... XXXV | 1.5 | CH₂CN (benzyl cyanide) | 1.0 | Activated alumina | THF | 30 | [(C₆H₅)₂PCH₂CH₂CH(CN)(C₆H₅)]⁺ I⁻ |
| LXXII...... LV | 1.8 | C₆H₅CH(CO₂C₂H₅)₂ | 1.0 | NaOH | THF | 15 | [(4-ClC₆H₄)₃PCH₂CH₂C(C₆H₅)(CO₂C₂H₅)₂]⁻ Cl⁻ |
| LXXIII...... XXXVI | 0.5 | cyclopentyl-CH(CO₂C₂H₅)₂ | 1.0 | (CH₃)₄N | DME | 45 | [(4-CH₃C₆H₄)₃PCH₂CH₂C(cyclopentyl)(CO₂C₂H₅)₂]⁻ Cl⁻ |
| LXIV...... LVII | 1.0 | CH₂(CONH₂)₂ | 3.0 | CH₃ONa | DME | 28 | [(CH₃)₃PCH₂CH₂CH(CONH₂)₂]⁺ Br⁻ |
| LXV...... XXXIX | 2.0 | NO₂CH₃ | 1.0 | (C₃H₇)₃N | Dioxane | 30 | [(C₄H₉)₃PCH₂CH₂CH₂NO₂]⁺ Cl⁻ |
| LXVI...... LIX | 1.0 | NO₂(C₂H₅) | 1.0 | Ba(OH)₂ | THF | 22 | [(C₆H₅)₃PCH₂CH₂CH(C₂H₅)(NO₂)]⁺ Cl⁻ |
| LXVII...... XXXVII | 1.0 | Naphthol | 1.0 | NaOH | Diglyme | 41 | [(CH₃C₆H₄)₃PCH₂]⁺(hydroxynaphthyl) Cl⁻ |
| LXXVIII...... LVII | 2.0 | 2,4-dimethylcyclopentene-1-one | 1.0 | CH₃ONa | DME | 26 | [(CH₃)₃PCH₂CH₂P(CH₃)-(2,4-dimethylcyclopentenonyl)]⁺ Br⁻ |

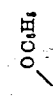

The products of Examples LXX(a) through LXXXVII may be employed as fire retardants in the manner defined hereinabove for the phosphonium salts of Equations B through E.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A process of preparing a compound of the formula

$$\left[ R'R^2R^3PCH_2CH_2 \overset{(O)_a}{\underset{\|}{P}} (R''')_2 \right]^{\oplus} \cdot X^{\ominus}$$

wherein $R^1$, $R^2$ and $R^3$ each represents alkyl $C_1$–$C_{16}$, lower alkoxy substituted alkyl $C_1$–$C_{16}$, cycloloweralkyl, phenyl or substituted phenyl in which the substituents are lower alkyl, lower alkoxy or halogen; X is halogen, $a$ is zero or one and R''' is lower alkyl or phenyl, by reacting a phosphonium salt having the formula

with a secondary phosphine or phosphine oxide of the formula

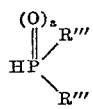

References Cited
UNITED STATES PATENTS

| 3,309,425 | 3/1967 | Gillham et al. | 260—606.5 F |
| 3,314,929 | 4/1967 | Rauhut | 260—606.5 F |
| 3,422,149 | 1/1969 | Rauhut et al. | 260—606.5 F |

DANIEL E. WYMAN, Primary Examiner

A. P. DEMERS, Assistant Examiner

U.S. Cl. X.R.

260—45.7 P, 45.95, 340.7, 462, 465 G, 465.1, 485 J, 488 R, 561 P, 586, 593, 606.5 P, 932, 968